US009794256B2

(12) United States Patent
Kiang et al.

(10) Patent No.: US 9,794,256 B2
(45) Date of Patent: Oct. 17, 2017

(54) SYSTEM AND METHOD FOR ADVANCED CONTROL TOOLS FOR ADMINISTRATORS IN A CLOUD-BASED SERVICE

(71) Applicant: Box, Inc., Los Altos, CA (US)

(72) Inventors: Andy Kiang, Mountain View, CA (US); Kevin Tu, San Francisco, CA (US); Philip Sheffield, San Francisco, CA (US); Alexander Vaughn, San Jose, CA (US); Timothy Heilig, Millbrae, CA (US); Elena Andreevna Tatarchenko, Mountain View, CA (US); Matthew Taro Duvall, San Francisco, CA (US); Natalia Vinnik, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 13/954,680

(22) Filed: Jul. 30, 2013

(65) Prior Publication Data

US 2014/0033324 A1   Jan. 30, 2014

Related U.S. Application Data

(60) Provisional application No. 61/677,249, filed on Jul. 30, 2012, provisional application No. 61/706,546, (Continued)

(51) Int. Cl.
*H04L 29/06* (2006.01)
*H04L 29/08* (2006.01)

(52) U.S. Cl.
CPC .............. *H04L 63/10* (2013.01); *H04L 67/04* (2013.01); *H04L 67/22* (2013.01); *H04L 67/2861* (2013.01)

(58) Field of Classification Search
None
See application file for complete search history.

(56) References Cited

U.S. PATENT DOCUMENTS

| 858,619 | A | 7/1907 | O'Farrell |
| 5,043,876 | A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

Kretzschmar et al., Functional components for a Security Manager within future Inter-Cloud enviroments, © 2011 IEEE, 5 pages.*

(Continued)

*Primary Examiner* — Jeffrey Pwu
*Assistant Examiner* — Baotram Tran
(74) *Attorney, Agent, or Firm* — Perkins Coie LLP

(57) ABSTRACT

A cloud-based platform (e.g., cloud-based collaboration and/or storage platform/service) is described that provides advanced control tools for administrators of an enterprise account. The advanced control tools permit the administrator to set mobile security settings for mobile devices running applications that allow a user to access enterprise data in the cloud-based platform; activity notification archiving; support for multiple email domains; automation processes; and policies. The settings selected by the administrator are applied enterprise-wide within the cloud-based platform.

9 Claims, 19 Drawing Sheets

Related U.S. Application Data filed on Sep. 27, 2012, provisional application No. 61/708,926, filed on Oct. 2, 2012.

(56) References Cited

U.S. PATENT DOCUMENTS

| | | | |
|---|---|---|---|
| 5,742,905 A | 4/1998 | Pepe et al. |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,926,816 A | 7/1999 | Bauer et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,233,997 B1* | 6/2007 | Leveridge .............. G06F 21/33 709/217 |
| 7,275,244 B1 | 9/2007 | Charles Bell et al. |
| 7,296,025 B2 | 11/2007 | Kung et al. |
| 7,310,684 B2 | 12/2007 | Patrick et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,653,668 B1 | 1/2010 | Shelat et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,735,144 B2 | 6/2010 | Pravetz et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,126,848 B2 | 2/2012 | Wagner |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1* | 6/2012 | Zhu .................. G06Q 20/382 705/51 |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1* | 8/2012 | Cohen .................. G06F 21/12 726/1 |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,458,128 B2 | 6/2013 | Khosravy et al. |
| 8,464,161 B2 | 6/2013 | Giles et al. |
| 8,464,167 B2 | 6/2013 | Saund et al. |
| 8,473,775 B1 | 6/2013 | Helmick et al. |
| 8,515,902 B2 | 8/2013 | Savage |
| 8,527,549 B2 | 9/2013 | Cidon |
| 8,528,087 B2 | 9/2013 | Hsu et al. |
| 8,549,066 B1 | 10/2013 | Donahue et al. |
| 8,549,511 B2 | 10/2013 | Seki et al. |
| 8,572,022 B2 | 10/2013 | Hagan et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 | 7/2014 | Khalid |
| 8,819,068 B1 | 8/2014 | Knote et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,869,235 B2 | 10/2014 | Qureshi et al. |
| 8,886,925 B2 | 11/2014 | Qureshi et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |

(56) References Cited

U.S. PATENT DOCUMENTS

| | | |
|---|---|---|
| 8,949,179 B2 | 2/2015 | Besen et al. |
| 8,949,939 B2 | 2/2015 | Peddada |
| 8,955,103 B2 | 2/2015 | Kline, III et al. |
| 8,956,103 B2 | 2/2015 | Gehring |
| 8,959,579 B2 | 2/2015 | Barton et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,054,919 B2 | 6/2015 | Kiang et al. |
| 9,213,684 B2 | 12/2015 | Lai et al. |
| 9,239,846 B2 | 1/2016 | Besen et al. |
| 9,244,934 B2 | 1/2016 | Besen et al. |
| 9,268,655 B2 | 2/2016 | Chan et al. |
| 9,396,216 B2 | 7/2016 | Barreto et al. |
| 9,396,245 B2 | 7/2016 | Mackenzie et al. |
| 9,407,664 B1 | 8/2016 | Banerjee |
| 9,495,434 B1 | 11/2016 | Walton et al. |
| 9,507,795 B2 | 11/2016 | Dorman et al. |
| 9,547,658 B2 | 1/2017 | Fan et al. |
| 9,558,202 B2 | 1/2017 | Lockhart et al. |
| 9,563,517 B1 | 2/2017 | Natanzon et al. |
| 9,575,981 B2 | 2/2017 | Dorman et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0073448 A1* | 4/2003 | Ozeki ............... H04M 1/673 455/456.3 |
| 2003/0084306 A1 | 5/2003 | Abburi et al. |
| 2003/0093404 A1 | 5/2003 | Bader et al. |
| 2003/0097374 A1 | 5/2003 | Himeno |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267825 A1 | 12/2004 | Novak et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1* | 1/2005 | Gabriel ............... G06Q 20/3674 725/28 |
| 2005/0028006 A1 | 2/2005 | Leser et al. |
| 2005/0033777 A1 | 2/2005 | Moraes et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1* | 4/2006 | Gillette ............... G06F 17/30067 709/219 |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174054 A1 | 8/2006 | Matsuki |
| 2006/0179070 A1 | 8/2006 | George et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011469 A1 | 1/2007 | Allison et al. |
| 2007/0016680 A1 | 1/2007 | Burd et al. |
| 2007/0028291 A1* | 2/2007 | Brennan ............... H04L 63/1408 726/1 |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1* | 6/2007 | Bushnell ............... H04W 8/18 455/414.1 |
| 2007/0157203 A1* | 7/2007 | Lim ............... G06F 9/468 718/100 |
| 2007/0162610 A1 | 7/2007 | Un et al. |
| 2007/0179993 A1 | 8/2007 | Arruza |
| 2007/0185885 A1* | 8/2007 | Tamura ............... G06F 17/30011 |
| 2007/0195779 A1* | 8/2007 | Judge ............... H04L 12/585 370/392 |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |

(56) References Cited

U.S. PATENT DOCUMENTS

| | | |
|---|---|---|
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1* | 1/2008 | Naghi ............... G06F 21/10 709/204 |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1* | 3/2008 | Lim ............... G06F 17/3089 |
| 2008/0059656 A1 | 3/2008 | Saliba et al. |
| 2008/0060080 A1* | 3/2008 | Lim ............... H04L 63/20 726/26 |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1* | 6/2010 | Esteve Balducci ..... H04L 63/20 726/1 |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |

(56) References Cited

U.S. PATENT DOCUMENTS

| | | |
|---|---|---|
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1* | 11/2011 | Goldschlag ............. H04W 4/00 709/224 |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0313803 A1 | 12/2011 | Friend et al. |
| 2011/0314145 A1* | 12/2011 | Raleigh ............... H04L 41/0893 709/224 |
| 2011/0320197 A1 | 12/2011 | Conejero et al. |
| 2011/0320936 A1 | 12/2011 | Mohan et al. |
| 2012/0030187 A1 | 2/2012 | Marano et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0108200 A1* | 5/2012 | Rubin ..................... H04L 47/14 455/405 |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1* | 8/2012 | Uner ..................... G06F 21/51 726/1 |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1* | 9/2012 | Sinha ..................... H04W 12/08 726/1 |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1* | 12/2012 | Dellinger ............ H04N 5/23206 715/835 |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |

(56) References Cited

U.S. PATENT DOCUMENTS

| | | | |
|---|---|---|---|
| 2013/0073621 A1* | 3/2013 | Waddoups | G06F 21/6218 709/204 |
| 2013/0080765 A1 | 3/2013 | Mohanty et al. | |
| 2013/0080919 A1 | 3/2013 | Kiang et al. | |
| 2013/0110565 A1 | 5/2013 | Means, Jr. et al. | |
| 2013/0110961 A1 | 5/2013 | Jadhav | |
| 2013/0117226 A1 | 5/2013 | Jain et al. | |
| 2013/0117337 A1 | 5/2013 | Dunham | |
| 2013/0117376 A1 | 5/2013 | Filman et al. | |
| 2013/0124458 A1 | 5/2013 | Barreto et al. | |
| 2013/0124638 A1 | 5/2013 | Barreto et al. | |
| 2013/0124984 A1 | 5/2013 | Kuspa | |
| 2013/0138608 A1 | 5/2013 | Smith | |
| 2013/0138615 A1 | 5/2013 | Gupta et al. | |
| 2013/0151690 A1 | 6/2013 | Shah et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0179947 A1 | 7/2013 | Kline, III et al. | |
| 2013/0185347 A1 | 7/2013 | Romano | |
| 2013/0185452 A1* | 7/2013 | Burckart | H04L 65/4084 709/231 |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212067 A1 | 8/2013 | Piasecki et al. | |
| 2013/0212486 A1 | 8/2013 | Joshi et al. | |
| 2013/0218978 A1 | 8/2013 | Weinstein et al. | |
| 2013/0219176 A1 | 8/2013 | Akella et al. | |
| 2013/0226876 A1 | 8/2013 | Gati et al. | |
| 2013/0227522 A1 | 8/2013 | Lerum et al. | |
| 2013/0239049 A1 | 9/2013 | Perrodin et al. | |
| 2013/0246901 A1 | 9/2013 | Massand | |
| 2013/0246932 A1 | 9/2013 | Zaveri et al. | |
| 2013/0254699 A1 | 9/2013 | Bashir et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0268999 A1 | 10/2013 | Kiang et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0282658 A1 | 10/2013 | Besen et al. | |
| 2013/0282830 A1 | 10/2013 | Besen et al. | |
| 2013/0283106 A1* | 10/2013 | King | G06F 11/327 714/49 |
| 2013/0304679 A1 | 11/2013 | Fleming et al. | |
| 2013/0304694 A1 | 11/2013 | Barreto et al. | |
| 2013/0304697 A1 | 11/2013 | Movida | |
| 2013/0305039 A1 | 11/2013 | Gauda | |
| 2013/0325803 A1 | 12/2013 | Akirav et al. | |
| 2013/0326344 A1 | 12/2013 | Masselle et al. | |
| 2014/0006357 A1 | 1/2014 | Davis et al. | |
| 2014/0006465 A1 | 1/2014 | Davis et al. | |
| 2014/0007205 A1* | 1/2014 | Oikonomou | G06F 21/35 726/6 |
| 2014/0013112 A1 | 1/2014 | Cidon et al. | |
| 2014/0019497 A1 | 1/2014 | Cidon et al. | |
| 2014/0019498 A1 | 1/2014 | Cidon et al. | |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0040182 A1 | 2/2014 | Gilder et al. | |
| 2014/0040206 A1 | 2/2014 | Ramakrishnan et al. | |
| 2014/0047509 A1 | 2/2014 | Bhogal et al. | |
| 2014/0052939 A1 | 2/2014 | Tseng et al. | |
| 2014/0059002 A1 | 2/2014 | Lockhart et al. | |
| 2014/0059217 A1 | 2/2014 | Pizurica | |
| 2014/0068589 A1 | 3/2014 | Barak | |
| 2014/0074629 A1 | 3/2014 | Rathod | |
| 2014/0082071 A1 | 3/2014 | Rexer | |
| 2014/0149461 A1 | 5/2014 | Wijayaratne et al. | |
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |
| 2014/0172783 A1 | 6/2014 | Suzuki et al. | |
| 2014/0172799 A1 | 6/2014 | Dorman | |
| 2014/0188798 A1 | 7/2014 | Mackenzie et al. | |
| 2014/0195485 A1 | 7/2014 | Dorman | |
| 2014/0201138 A1 | 7/2014 | Dorman et al. | |
| 2014/0201145 A1 | 7/2014 | Dorman et al. | |
| 2014/0215303 A1 | 7/2014 | Grigorovitch et al. | |
| 2014/0230011 A1 | 8/2014 | Drewry et al. | |
| 2014/0244600 A1 | 8/2014 | Schmidt et al. | |
| 2014/0258350 A1 | 9/2014 | Duval et al. | |
| 2014/0280605 A1 | 9/2014 | Zhang | |
| 2014/0337291 A1 | 11/2014 | Dorman et al. | |
| 2014/0337482 A1 | 11/2014 | Houston et al. | |
| 2014/0337491 A1 | 11/2014 | Barreto et al. | |
| 2014/0344456 A1 | 11/2014 | Buzbee et al. | |
| 2014/0359085 A1 | 12/2014 | Chen | |
| 2014/0359286 A1 | 12/2014 | Wen et al. | |
| 2014/0372376 A1 | 12/2014 | Smith et al. | |
| 2014/0379647 A1 | 12/2014 | Smith et al. | |
| 2014/0379760 A1 | 12/2014 | Martin et al. | |
| 2015/0019723 A1 | 1/2015 | Kweon et al. | |
| 2015/0039556 A1 | 2/2015 | Mackenzie et al. | |
| 2015/0154156 A1 | 6/2015 | Meyers, Jr. et al. | |
| 2015/0186668 A1 | 7/2015 | Whaley et al. | |
| 2015/0237406 A1 | 8/2015 | Ochoa et al. | |
| 2015/0339113 A1 | 11/2015 | Dorman et al. | |
| 2016/0065672 A1 | 3/2016 | Savage et al. | |
| 2016/0350326 A1 | 12/2016 | Simonetti | |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A1 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Li et al., CloudVO: Building a Secure Virtual Organization for Multiple Clouds Collaboration, © 2010 IEEE, 6 pages.*

(56) References Cited

OTHER PUBLICATIONS

Mont et al., Risk Assessment and Decision Support for Security Policies and Related Enterprise Operational Processes, © 2011 IEEE, 4 pages.*
TaheriMonfared et al., Monitoring Intrusions and Security Breaches in Highly Distributed Cloud Environments, © 2011 IEEE, 6 pages.*
Vimercati et al., Managing and Accessing Data in the Cloud: Privacy Risks and Approaches, © 2012 CRiSIS, 9 pages.*
Wang et al., Data Leakage Mitigation for Discretionary Access Control in Collabarotion Clouds, © 2011 ACM, 10 pages.*
Exam Report for GB1410569.6 Applicant: Box, Inc. dated Jul. 11, 2014, 9 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. dated Nov. 21, 2013, 7 pages.
Exam Report for GB1309209.3, Applicant: Box, Inc. dated Oct. 30, 2013, 11 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.

Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Patent Court Document of Approved Judgment for GB0602349.3 and GB0623571.7; dated Mar. 3, 2009, 17 pages.
International Search Report and Written Opinion for PCT/US2013/034765, Applicant: Box, Inc., dated Jan. 20, 2014, 15 pages.
Exam Report for EP13185269.1, Applicant: Box, Inc. dated Jan. 28, 7 pages.
Exam Report for GB1314771.5, Applicant: Box, Inc. dated Feb. 17, 2014, 7 pages.
Exam Report for GB1308842.2, Applicant: Box, Inc. dated Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. dated Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
"Conceptboard", One Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. dated Jun. 4, 2013, 8 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1310666.1, Applicant: Box, Inc. dated Aug. 30, 2013, 10 pages.
Exam Report for GB1313559.5, Applicant: Box, Inc., dated Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.

(56) References Cited

OTHER PUBLICATIONS

International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for GB1312264.3, Applicant: Box, Inc. dated Mar. 24, 2014, 7 pages.
Exam Report for GB1318792.7, Applicant: Box, Inc. dated May 22, 2014, 2 pages.

John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1316532.9; Applicant: Box, Inc., dated Mar. 8, 2016, 3 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for GB1316532.9, Applicant: Box, Inc. dated Mar. 27, 2015, 6 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1220644.7, Applicant: Box, Inc. dated May 1, 2015, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
Exam Report for GB1413461.3; Applicant: Box, Inc., dated Aug. 21, 2015, 6 pages.
Fu et al., "Efficient and Fine-Grained Sharing of Encrypted Files," Quality of Service (IWQos), 2010 18th International Workshop on year 2010, pp. 1-2.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
Exam Report for GB1309209.3 Applicant: Box, Inc. dated Jan. 19, 2015, 6 pages.
Exam Report for EP 13177108.1, Applicant: Box, Inc. dated Feb. 17, 2015, 6 pages.
Exam Report for GB1312264.3, Applicant: Box, Inc. dated Jan. 30, 2015, 5 pages.
Exam Report for GB1312874.9, Applicant: Box, Inc. dated Feb. 10, 2015, 7 pages.
Exam Report for GB1316685.5, Applicant: Box, Inc. dated Feb. 17, 2015, 5 pages.
Exam Report for EP 13185269.1, Applicant: Box, Inc., dated Feb. 13, 2015, 8 pages.

(56) References Cited

OTHER PUBLICATIONS

Burney, "How to Move Document from Your Computer to Your iPad and Back Again," May 31, 2011, 3 pages.
Exam Report for GB1311459.0, Applicant: Box, Inc., dated Aug. 19, 2013, 6 pages.
U.S. Appl. No. 60/992,656, filed Dec. 5, 2007 Methods and Systems for Open Source Collaboration in an Application Service Provider Environment.
U.S. Appl. No. 61/055,901, filed May 23, 2008 Methods and Systems for Open Source Integration.
U.S. Appl. No. 13/412,549, filed Mar. 5, 2012 Methods and Systems for Open Source Collaboration in an Application Service Provider Environment.
U.S. Appl. No. 13/646,339, filed Oct. 5, 2012 File Management System and Collaboration Service and Integration Capabilities With Third Party Applications.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,356, filed Aug. 17, 2012 Extended Applications of Multimedia Content Previews in the Cloud-Based Content Management System.
U.S. Appl. No. 13/274,268, filed Oct. 14, 2011 Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform and Application Independent Method for Document Editing and Version Tracking via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview for Mobile Devices.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 13/345,502, filed Jan. 6, 2012 System and Method for Actionable Event Generation for Task Delegation and Management via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion via Partnership Driven Automatic Account Upgrades.
U.S. Appl. No. 61/620,554, filed Apr. 5, 2012 Device Pinning Capability for Enterprise Cloud Service and Storage Accounts.
U.S. Appl. No. 13/493,922, filed Jul. 11, 2012 Device Pinning Capability for Enterprise Cloud Service and Storage Accounts.
U.S. Appl. No. 61/649,869, filed Mar. 21, 2012 Selective Application Access Control via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.

(56) References Cited

OTHER PUBLICATIONS

U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.
U.S. Appl. No. 61/622,868, filed Apr. 11, 2012 Web and Desktop Client Synchronization of Mac Packages With a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events that Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementation of Synchronization Client Selective Subfolder Synchronization in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform via a Native Client to the Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/667,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784, filed Oct. 11, 2012 Highly Available Ftp Servers for a Cloud-Based Service.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments via Email.
U.S. Appl. No. 13/937,124, filed Jul. 8, 2013 Systems and Methods for Securely Submitting Comments Among Users via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods and Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012, Force Upgrade of a Mobile Application via Server Side Configuration Files.
U.S. Appl. No. 13/776,467, filed Feb. 25, 2013 Force Upgrade of a Mobile Application via Server Side Configuration File.
U.S. Appl. No. 61/697,477, filed Sep. 6, 2012 Disabling the Self-Referential Appearance of a Mobile Application in an Intent via a Background Registration.
U.S. Appl. No. 13/794,401, filed Mar. 11, 2013 Disabling the Self-Referential Appearance of a Mobile Application in an Intent via a Background Registration.
U.S. Appl. No. 61/697,511, filed Sep. 6, 2012 Channel for Opening and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 13/969,474, filed Aug. 16, 2013 Client-Server Fast Upload and Download Feedback Optimizers.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discovery and Identification of Recommended Collaborators in a Cloud Platform.
U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.

(56) References Cited

OTHER PUBLICATIONS

U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/710,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.
U.S. Appl. No. 13/953,668, filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2013 Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform Featuring Multifunctional Access and Engagement in a Collaborative Environment Provided by a Cloud-Based Platform.
U.S. Appl. No. 14/027,147, filed Sep. 13, 2013 System and Method for Rendering Document in Web Browser or Mobile Device Regardless of Third-Party Plug-In Software.
Cicnavi, "Offline Files in XP," Nov. 29, 2010, UtilizeWndows, pp. 1-6.

* cited by examiner

Automation

*Filter by automation*

+ New Automation
Approval Process
Vacation Request
Electronic Signature
Marketing Design Review
Sales Collaboration
Expense Sign-Off

Add Automation

Automation name: [Approval Process]

▼ Step 1

If this happens: [File ▼] is [Uploaded ▼]
To: Robert Johnson/Sales/.../.../2013_Predictions Then do this: [Assign a task ▼]
Kind: [Approval ▼]
To: aconn@box.com Summary: If a file is uploaded to the 2013_Predictions folder, then assign an approval task to Andrew Conn.

[Add Step]

[Start Automation] [Cancel]

*FIG. 7*

Policies

*Filter by policy*

+ Add New Policy
Credit Card Numbers
Social Security Numbers
Confidential
Redacted, Restricted
Health Record Number
Do Not Distribute
Download Policies
Sharing Policies

Add Policy

Policy name: *Untitled policy*

Policy type: ○ Upload ● Download ○ Sharing

If a user downloads: [Number of files ▼] in [Time period ▼]
[Add Rule]

Then take the action: ☐ Only track for reporting
☑ Notify the email addresses:
aconn@box.com

[Start Policy Now] [Cancel]

Policies

*Filter by policy*

+ Add New Policy
Credit Card Numbers
Social Security Numbers
Confidential
Redacted, Restricted
Health Record Number
Do Not Distribute
Download Policies
Watchlist Policies

Social Security Numbers
Documents containing social security numbers and credit card numbers March 15, 2013
Policy start date 123,236
Documents processed on upload 245
Documents moved to quarantine

[ Edit Policy ] [ Delete Policy ]

[ View Quarantine Files ]

*FIG. 10B*

SYSTEM AND METHOD FOR ADVANCED CONTROL TOOLS FOR ADMINISTRATORS IN A CLOUD-BASED SERVICE

CROSS-REFERENCE TO RELATED APPLICATIONS

This application claims the benefit of U.S. Provisional Patent Application No. 61/708,926 entitled, "ADVANCED CONTROL TOOLS AND ENTERPRISE-WIDE SEARCH FOR ADMINISTRATORS IN AN ENTERPRISE," which was filed Oct. 2, 2012; U.S. Provisional Patent Application No. 61/677,249 entitled "ADVANCED SEARCH AND FILTERING MECHANISMS FOR ENTERPRISE ADMINISTRATORS IN A CLOUD-BASED ENVIRONMENT," which was filed on Jul. 30, 2012; and U.S. Provisional Patent Application No. 61/706,546 entitled "ADVANCED SEARCH AND FILTERING MECHANISMS FOR ENTERPRISE ADMINISTRATORS IN A CLOUD-BASED ENVIRONMENT," which was filed on Sep. 27, 2012, the contents of which are incorporated by reference in their entireties herein.

BACKGROUND

Security continues to be a major area of concern as more and more enterprises adopt cloud-based solutions for content management. When corporate content that is potentially stored in the cloud is accessed by many corporate users, there is typically an administrator that oversees and monitors the use of the cloud. Among other functions, the administrator may be responsible for ensuring the security of the corporate data stored in the cloud, particularly with the increased access of cloud content via mobile devices.

BRIEF DESCRIPTION OF THE DRAWINGS

Examples of a cloud-based platform (e.g., cloud-based collaboration and/or storage platform/service) that provides advanced control tools to an administrator of an enterprise account are illustrated in the figures. The examples and figures are illustrative rather than limiting.

FIG. 7 depicts a screenshot showing an example of a user interface for selecting automation settings for an enterprise account in the cloud-based platform (e.g., cloud-based collaboration and/or storage platform/service).

FIG. 8 depicts a screenshot showing an example of a user interface for selecting policy settings for downloading information from an enterprise account in the cloud-based platform (e.g., cloud-based collaboration and/or storage platform/service).

FIG. 9 depicts a screenshot showing an example of a user interface for selecting policy settings for uploading information to an enterprise account in the cloud-based platform (e.g., cloud-based collaboration and/or storage platform/service). selecting details of a policy to be applied to an enterprise account in the cloud-based platform (e.g., cloud-based collaboration and/or storage platform/service).

FIG. 10B depicts a screenshot showing an example of a user interface providing statistics about a previously defined policy in an enterprise account in the cloud-based platform (e.g., cloud-based collaboration and/or storage platform/service).

DETAILED DESCRIPTION

A cloud-based platform (e.g., cloud-based collaboration and/or storage platform/service) is described that provides advanced control tools for administrators of an enterprise account. The advanced control tools permit the administrator to set mobile security settings for mobile devices running applications that allow a user to access enterprise data in the cloud-based platform; activity notification archiving; support for multiple email domains; automation processes; and policies. The settings selected by the administrator are applied enterprise-wide within the cloud-based platform.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
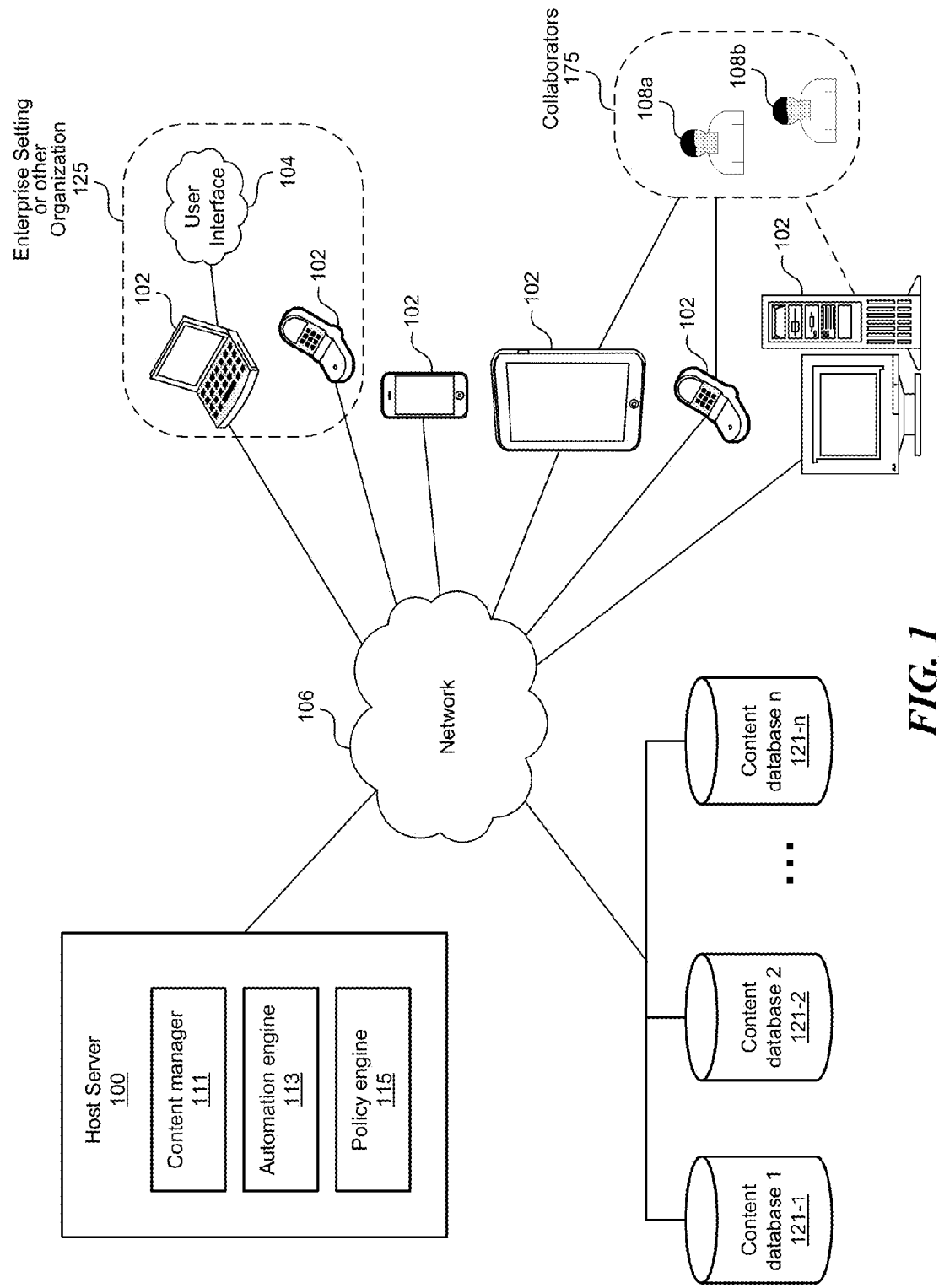
FIG. 1 illustrates an example diagram of a system where a host server provides advanced control tools to an administrator of an enterprise account in a cloud-based platform (e.g., cloud-based collaboration and/or storage platform/service).

FIG. 1 illustrates a diagram of an example system that has a host server 100 with a content manager 111 that provides advanced control tools to an administrator to select settings that apply across an enterprise or organization using a cloud-based platform (e.g., cloud-based collaboration and/or storage platform/service). The content manager 111 enables the administrator to select mobile security settings that apply to mobile devices accessing data in the cloud-based platform (e.g., cloud-based collaboration and/or storage platform/service), to customize automated actions performed across the enterprise, and to customize policies for data uploaded to, downloaded from, and shared within the cloud-based platform for the enterprise account.

The client devices 102 can be any system and/or device, and/or any combination of devices/systems that is able to establish a connection, including wired, wireless, cellular connections with another device, a server and/or other systems such as host server 100 via, for example, a web application. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a cloud-based platform (e.g., cloud-based collaboration and/or storage platform/service) (e.g., hosted by the host server 100). The collaboration environment or platform can have one or more collective settings 125 for an enterprise or an organization to which the users belong, and can provide a user interface 104 for the users to access such platform under the settings 125.

The cloud-based service (e.g., collaboration platform or environment) hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a workspace for other users to access (e.g., for viewing, editing, commenting, discussing, signing-off, or otherwise manipulating). The user can login to the online platform and upload the document (or any other type of work item) to an existing workspace or to a new workspace. The document can be shared with existing users or collaborators in a workspace. Each document, work item, file, and folder can only be owned by a single user. However, the owner of the document, work item, file, or folder can transfer ownership to another collaborator.

The content databases 121-1 to 121-$n$ store files and folders uploaded to the cloud-based platform (e.g., cloud-based collaboration and/or storage platform/service) along with metadata for the uploaded files and folders.

In some embodiments, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In some embodiments, communications to and from the client devices 102 can be achieved by, an open network, such as the Internet, or a private network, such as an intranet and/or the extranet. In some embodiments, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The automation engine 113 performs the automation processes set up by the administrator via the content manager 111, and the policy engine 115 executes the policies set up by the administrator via the content manager 111. As shown in FIG. 1, the automation engine 113 and the policy engine 115 are part of the host server 110. However, in some embodiments, one or both of the automation engine 113 and the policy engine 115 can be external to the host server 110. In some embodiments, the automation engine 113 and/or the policy engine 115 are accessed via the network 106 by the host server 110.

Figure 2:
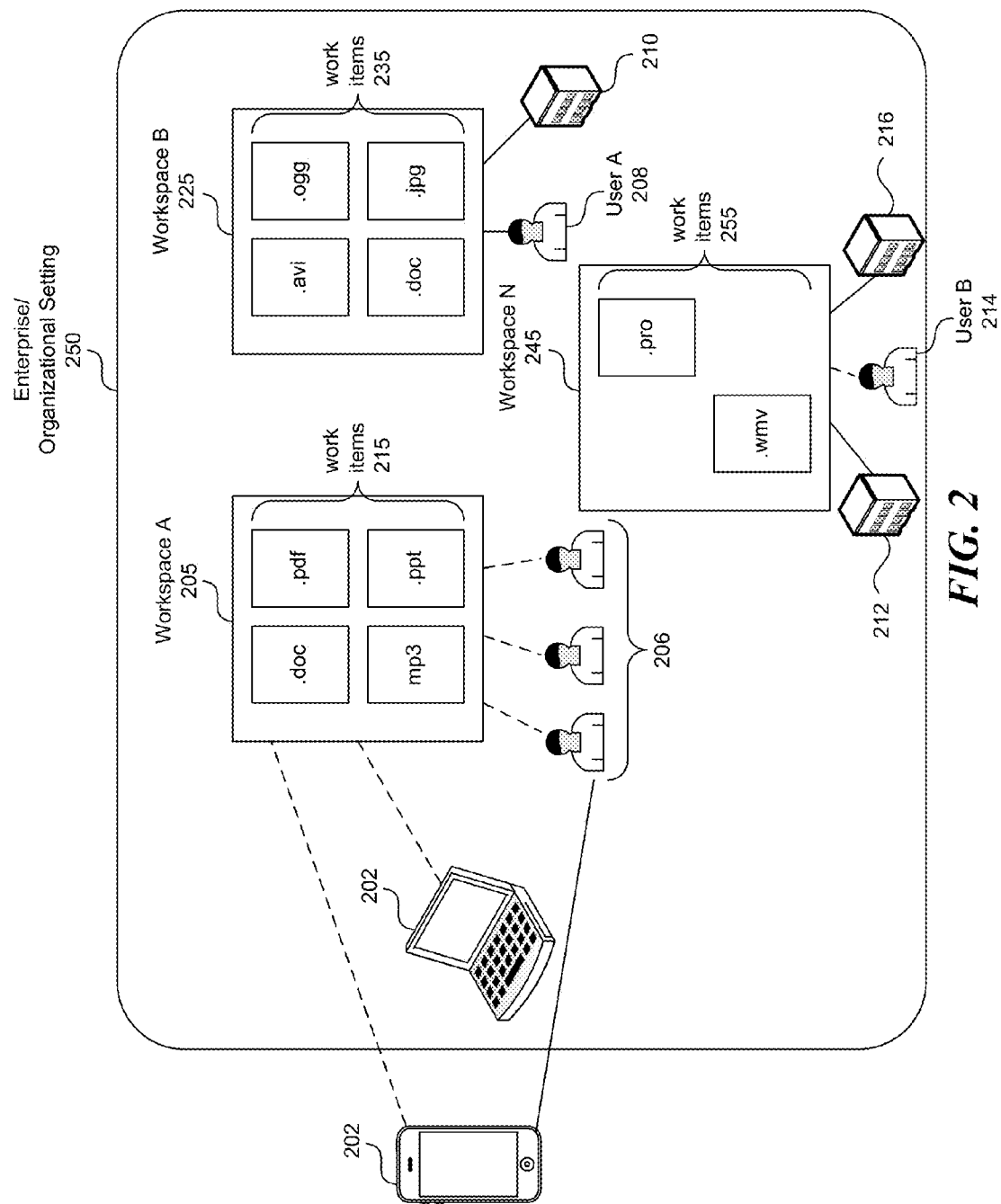
FIG. 2 depicts an example diagram of a web-based or cloud-based platform (e.g., cloud-based collaboration and/or storage platform/service) deployed in an enterprise or other organizational setting for organizing work items and workspaces.

FIG. 2 depicts an example diagram of a web-based or cloud-based platform (e.g., cloud-based collaboration and/or storage platform/service) deployed in an enterprise or other organizational setting 250 for organizing workspaces 205, 225, 245 and work items 215, 235, 255, where the work items and workspaces are hosted on content databases 1, 2, . . . n 121-1, 121-2, . . . 121-n.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, workspace A 205 may be associated with work items 215, workspace B 225 can be associated with work items 235, and workspace N 245 can be associated with work items 255. The work items 215, 235, and 255 may be unique to each workspace but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208, and workspace N 245 can be associated with departments 212 and 216 and users shown as example user B 214.

Figure 3:
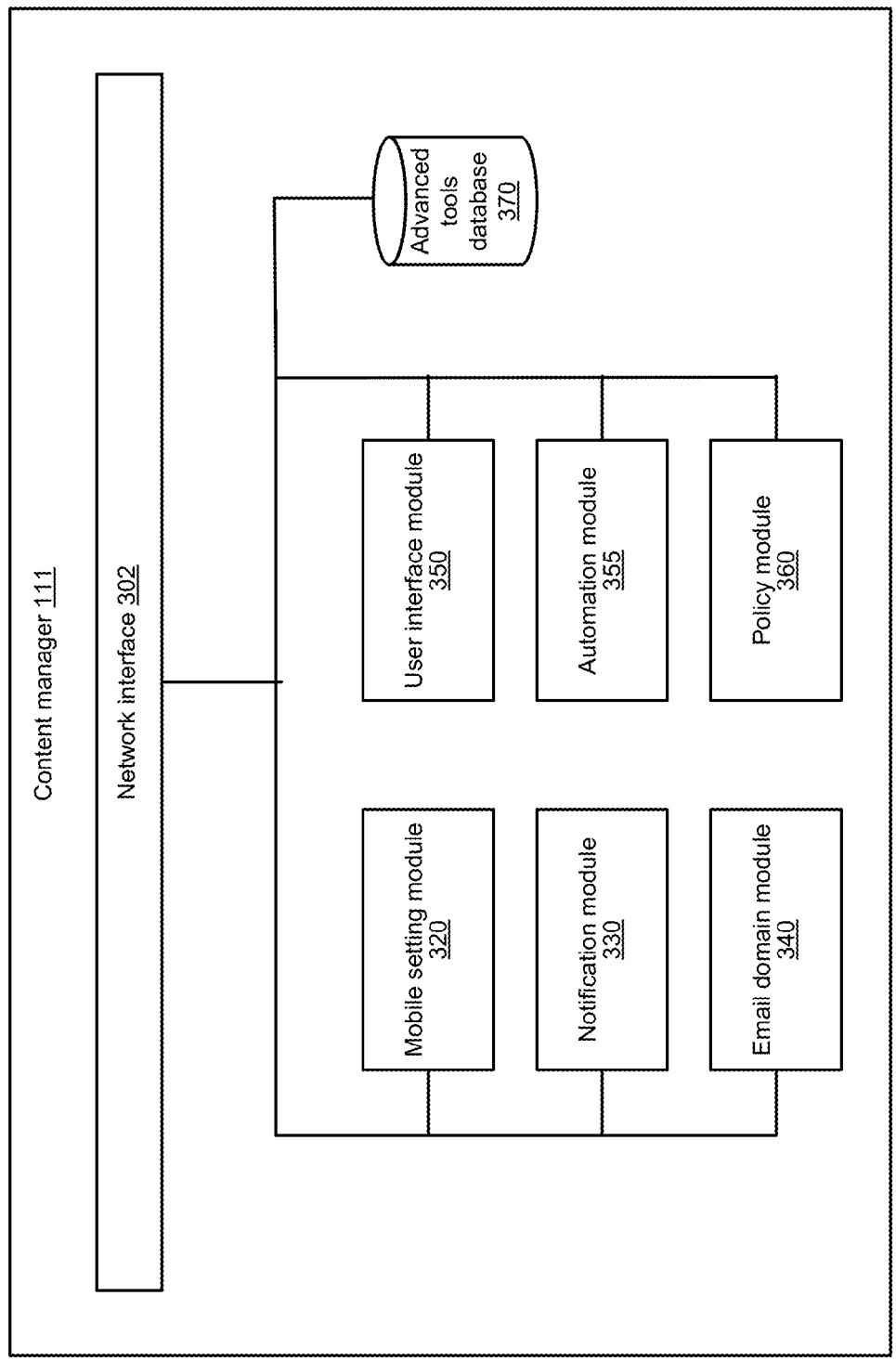
FIG. 3 depicts a block diagram illustrating an example of components in the content manager of a cloud-based platform (e.g., cloud-based collaboration and/or storage platform/service).

FIG. 3 depicts a block diagram illustrating an example of components in the content manager 111 of the host server 100 of a cloud-based platform (e.g., cloud-based collaboration and/or storage platform/service).

The host server 100 of the cloud-based platform (e.g., cloud-based collaboration and/or storage platform/service) can generally be a cloud-based service. The content manager 111 of the host server 100 can include, for example, a network interface 302, a mobile setting module 320, a notification module 330, an email domain module 340, a user interface module 350, an automation module 355, a policy module 360, and/or an advanced tools database 370. Additional or fewer components/modules/engines can be included in the host server 100, content manager 111, and each illustrated component.

The network interface 302 can be a networking module that enables the content manager 111 to mediate data in a network with an entity that is external to the content manager 111, through any known and/or convenient communications protocol supported by the content manager 111 and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module" or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Some embodiments of the content manager 111 include the user interface module 350 which can display or cause to be displayed a suitable user interface that presents appropriate information to the administrator and allows the administrator to enter information in response to provided prompts. The user interface module 350 works in conjunction with the mobile setting module 320, the notification module 330, the email domain module 340, the automation module 355, and the policy module 360. Each of these modules provides the prompts to be displayed by the user interface module 350 to the administrator, and, in some casese, provides a menu of inputs for the administrator to respond with.

Some embodiments of the content manager 111 include the mobile setting module 320 which can provide via the user interface module 350 a mobile security setting user interface for an administrator to set mobile security settings to be applied to mobile device applications that permit a user to access data stored within the enterprise account in the cloud-based service managed by the administrator. The mobile setting module 320 also receives the administrator's selected settings, and interacts with the mobile device applications to enforce the selected mobile security settings.

Figure 4A:
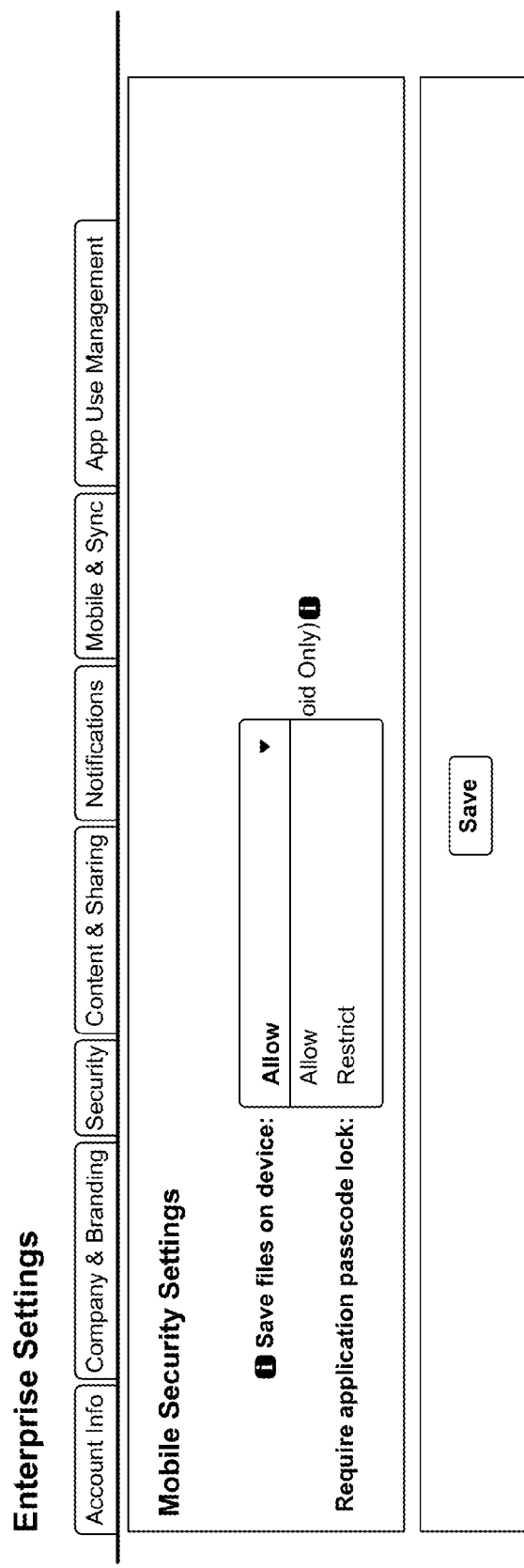
FIGS. 4A-4B depict screenshots showing examples of a user interface for selecting security settings for mobile devices accessing the enterprise's content in the cloud-based platform (e.g., cloud-based collaboration and/or storage platform/service).

FIG. 4A depicts a screenshot showing an example of a user interface, with information provided by the mobile setting module 320, for indicating whether files can be saved on mobile devices accessing the enterprise's content in the cloud-based platform (e.g., cloud-based collaboration and/or storage platform/service). The administrator can either permit files from the cloud-based platform to be saved on the mobile device or restrict or prevent the mobile device from saving files from the cloud-based platform on the mobile device. The administrator may choose the latter setting to ensure that data stored in the cloud remains protected even though users may access the data on a mobile device. In some embodiments, the administrator can allow files to be saved on mobile devices only when the device is encrypted, such as with Android devices.

Figure 4B:
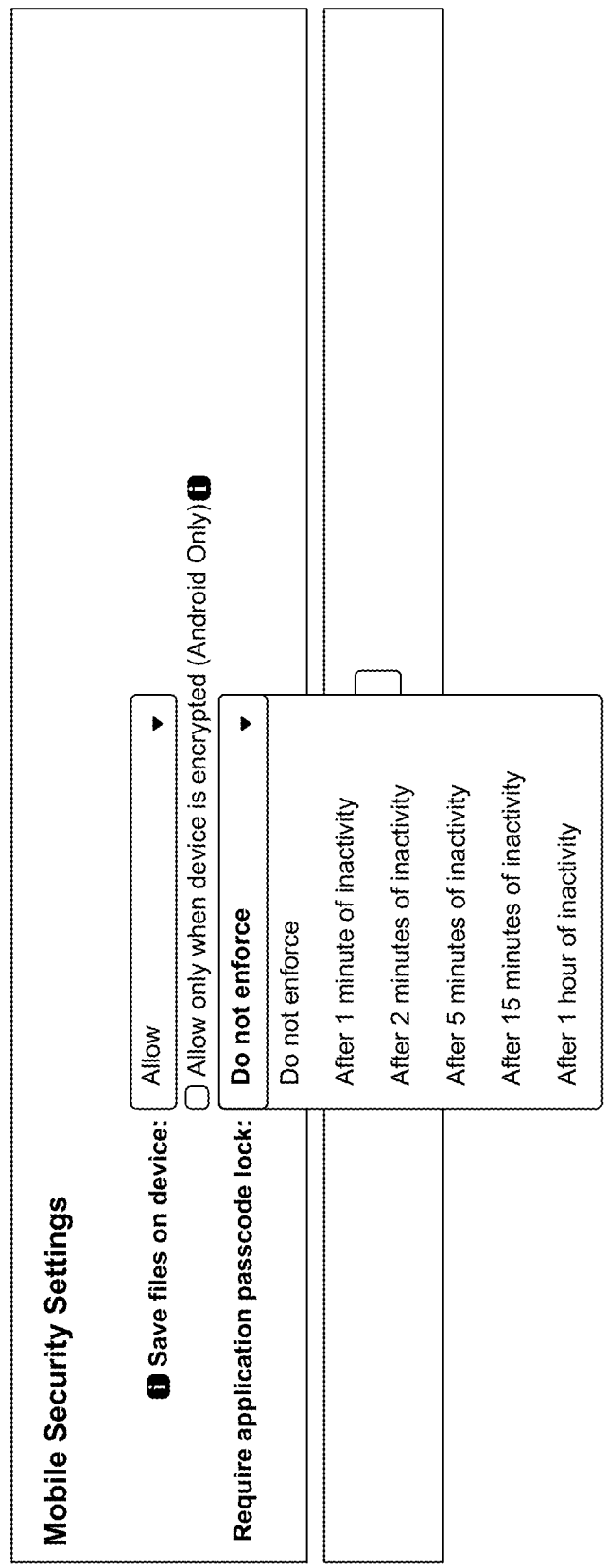

FIG. 4B depicts a screenshot showing an example of a user interface, with information provided by the mobile setting module 320, for selecting the duration of inactivity of the mobile device after which entry of an application passcode is required to access the enterprise's content in the cloud-based platform (e.g., cloud-based collaboration and/or storage platform/service). The administrator may select to not enforce this function. Alternatively, the administrator may select a period of inactivity, for example, one minute, two minutes, five minutes, 15 minutes, or an hour. Requiring the user to enter a passcode after the selected period of inactivity has elapsed helps reduce the likelihood that a passer-by will be able to access enterprise data if the owner of the mobile device steps away.

The mobile setting module 320 stores the administrator's selections in the advanced controls database 370. As shown in FIG. 3, the advanced controls database 370 is part of the content manager 111. However, in some embodiments, the advanced controls database 370 can be external to the content manager 111. In some embodiments, the advanced controls database 370 is accessed via the network 106 by the content manager 111.

The mobile setting module 320 interacts with each mobile device application every time a user logs in to the cloud-based service via the mobile device. After a user has logged in with the mobile device application, the mobile device application requests from the mobile setting module 320 the stored mobile security settings selected by the administrator. Upon receipt of the request, the mobile setting module 320 sends the stored settings to the mobile device application, and the application enforces the settings. Thus, the administrator's settings are applied to all mobile device applications on every mobile device attempting to access data managed by the administrator in the enterprise account in the cloud-based service.

Some embodiments of the content manager 111 include the notification module 330 which can provide via the user interface module 350 a compliance email archive user interface for enabling compliance email archiving and selecting settings for the archiving. Compliance email archiving is useful in certain industries, such as finance and healthcare, as well as with eDiscovery requirements. In these industries and with eDiscovery, it is required to keep all documentation of communication. In some embodiments of the cloud-based service, the cloud-based service allows users to communicate or enter free text that would be seen by or could be sent to another individual using the cloud-based service, for example, features such as comments, discussions, assigning tasks, and invitations. When compliance email archiving is enabled, whenever a user of the cloud-based service sends a communication, the notification module 330 will automatically email a hidden copy of the selected communication activity to a specified email address. The emails sent by the notification module 330 will ultimately need to be captured and tracked with a separate tracking and archiving system to support business compliance in regulated industries and with eDiscovery requirements.

Figure 5A:
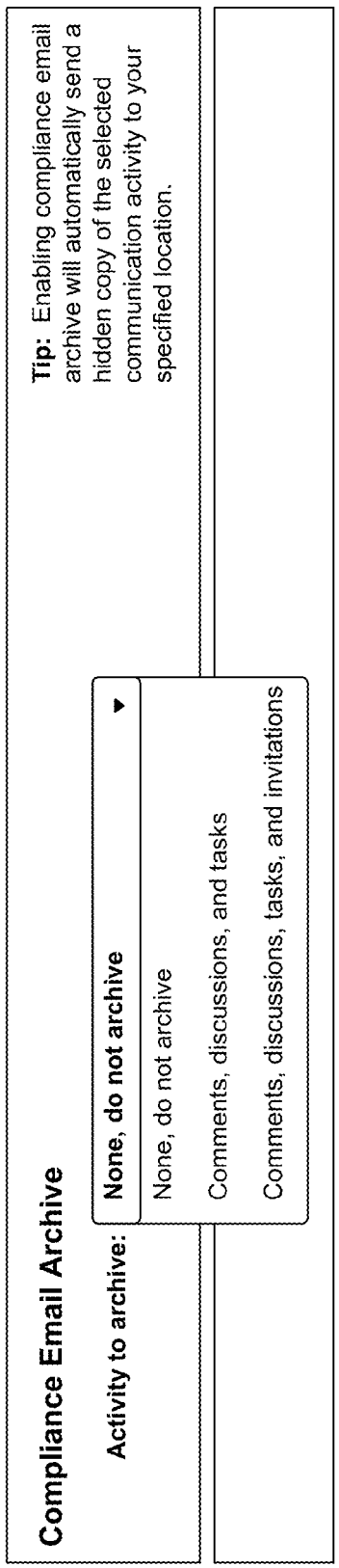
FIGS. 5A-5B depict screenshots showing examples of a user interface for selecting compliance email archive settings for an enterprise account in the cloud-based platform (e.g., cloud-based collaboration and/or storage platform/service).

FIG. 5A depicts a screenshot showing an example of a user interface, with information provided by the notification module 330, for selecting compliance email archive settings for an enterprise account in the cloud-based platform (e.g., cloud-based collaboration and/or storage platform/service). The enterprise administrator can disable compliance email archiving using this user interface. Alternatively, the administrator can select activities from preselected groups of activities to be archived, such as comments, discussions, and tasks; or comments, discussions, tasks, and invitations. In some embodiments, the administrator can select each activity to be included for compliance email archiving instead of choosing from preselected groups of activities.

Figure 5B:
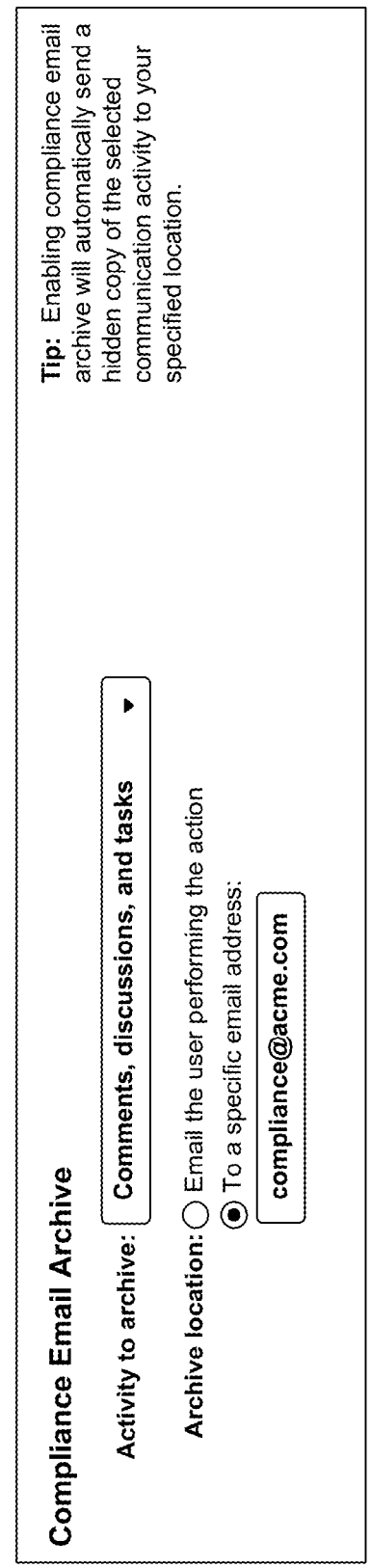

FIG. 5B depicts a screenshot showing an example of a user interface, with information provided by the notification module 330, for selecting an archiving destination for the compliance emails. For example, the administrator can choose to have compliance emails sent to the user performing the actions selected above, or sent to a specific email address entered by the administrator. In some embodiments, the user who took the action and to whom the communication was sent is placed in the header of the email, and the text of the communication and the context is placed in the body of the email.

After the administrator has selected the preferences for compliance emails for the enterprise, the notification module 330 stores the preferences in the advanced tools database 370 and begins appropriately tracking and implementing compliance email archiving.

Some embodiments of the content manager 111 include the email domain module 340 which can provide via the user interface module 350 an email domain support user interface for an administrator to create a single, centralized managed account across multiple email domains for all users. This is useful if a business operates within different countries or has multiple subsidiaries with users that have email addresses from different domains. When multiple email domain support is combined with enterprise-wide search, an administrator is provided the ability to search files being stored and shared across the entire enterprise or organization.

Figure 6:
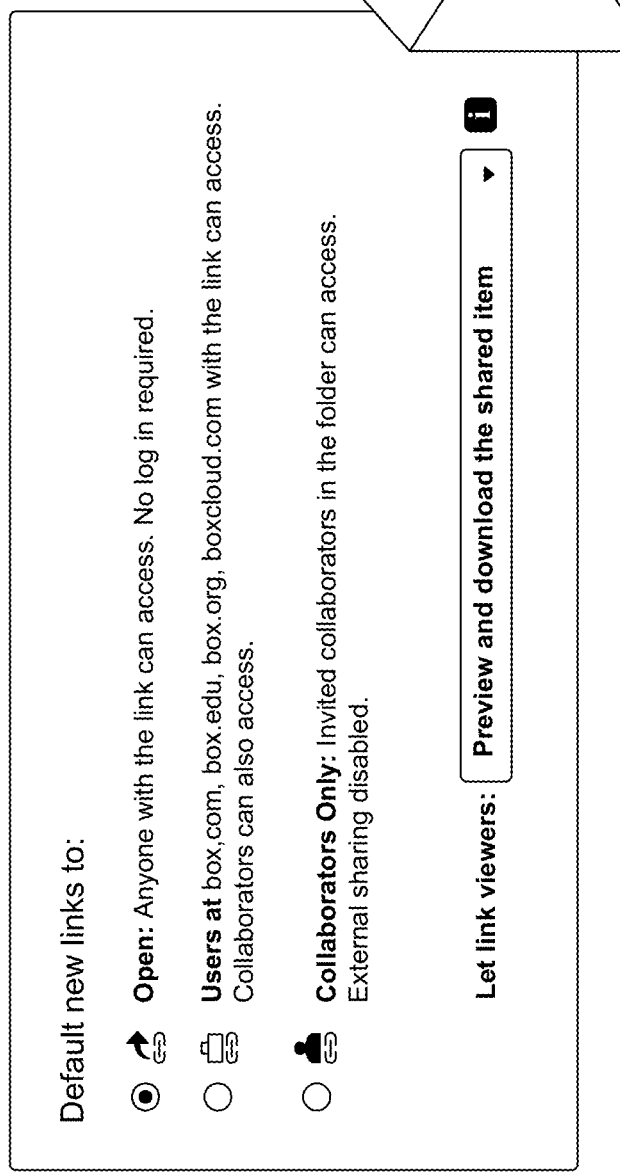
FIG. 6 depicts a screenshot showing an example of a user interface for selecting email domain support settings for an enterprise account in the cloud-based platform (e.g., cloud-based collaboration and/or storage platform/service).

FIG. 6 depicts a screenshot showing an example of a user interface, with information provided by the email domain module 340, for selecting email domain support settings for an enterprise account in the cloud-based platform (e.g., cloud-based collaboration and/or storage platform/service). In the example of FIG. 6, the administrator is provided three choices. The first choice allows anyone with a link to data in the enterprise account to access the data. No log in is required prior to accessing the link. The second choice allows users at specified email domains to access the link in addition to collaborators who have an email address that is not within the specified email domains. The administrator can be prompted to enter the email domains to be permitted access to links to data in the enterprise account. The third choice allows only collaborators in a folder to access the link. External sharing is disabled. While only three choices are provided in the example screenshot of FIG. 6, other choices can be provided to the administrator regarding required permissions prior to accessing a link.

Additionally, as shown in the example screenshot of FIG. 6, the administrator can select permissions for link viewers. For example, link viewers may be permitted to preview and download the shared item, further share the item, or just preview the item. Other permissions can also be selected by the administrator. Once the administrator has selected preferences regarding email domain support for the enterprise, the email domain module 340 stores the information in the advanced tools database 370 and proceeds to execute the administrator's selected choices.

Some embodiments of the content manager 111 include the automation module 355 which can provide via the user interface module 350 an automation user interface for adding a new automation process or editing an existing automation process. The automation process allows tasks within an enterprise account to be automated. For example, if a file is placed into a certain folder, then an approval process is initiated, and if a user approves something, then the process continues. Thus, multiple workflows can be concatenated with the automated process. In some embodiments, an automation process can provide anti-virus and/or malware detection on uploaded files to the enterprise account.

To define an automation process, the administrator selects a condition, and an action to perform if the condition is satisfied. Automation processes can have more than a single condition and action. FIG. 7 depicts a screenshot showing an example of a user interface, with information provided by the automation module 355, for selecting automation settings for an enterprise account in the cloud-based platform (e.g., cloud-based collaboration and/or storage platform/service). The administrator begins by naming the automation process, as shown near the top of the example screenshot in FIG. 7. Any previously defined automation processes are presented in a list to the left of the user interface so that the administrator can select one for reviewing and/or editing. The automation process is defined by specifying a condition and corresponding action to be performed if the condition is met. In the example of FIG. 7, the condition is when a file is uploaded to the cloud-based service to a particular folder, and the corresponding action to be performed if this condition is met is to assign an approval task to the user whose email address is entered by the administrator. Other example of a condition includes when a task is completed; when a file commented on; and when a folder is shared. The administrator can choose to add additional condition/action steps. The administrator also has the option to cancel any automation process for the enterprise.

A condition can be set to be the occurrence of any type of action identified by the administrator, for example, uploading, downloading, or sharing a file. The action to be performed upon meeting the condition can also be set to be any type of action.

Once the administrator has selected preferences regarding an automation process for the enterprise, the automation module 355 stores the information in the advanced tools database 370, and the automation engine 113 executes the stored automation process.

Some embodiments of the content manager 111 include the policy module 360 which can provide via the user interface module 350 a policy user interface for adding a new policy or editing an existing policy.

To define a policy, the administrator selects a policy type, a condition, and an action to perform if the condition is satisfied. FIG. 8 depicts a screenshot showing an example of a user interface, with information provided by the policy module 350, for selecting policy settings for downloading information from an enterprise account in the cloud-based platform (e.g., cloud-based collaboration and/or storage platform/service). The administrator begins by naming the policy, as shown near the top of the example screenshot in FIG. 8. Any previously defined policies are presented in a list to the left of the user interface so that the administrator can select a policy for reviewing and/or editing. The policy is defined by specifying a policy type, such as upload, download, or sharing. Other policy types may also be specified. In the example of FIG. 8, the policy type is download. The policy module 360 then prompts the administrator with appropriate prompts corresponding to the download policy.

The policy is further defined by specifying a condition and corresponding action if the condition is met. In some embodiments, the policy module 360 can provide the user with selections from a menu corresponding to the selected policy type. For the condition for the example in FIG. 8, the administrator is prompted to select a number of downloaded files (e.g., 50-to 100 files or 500 to 1000 files) and a time period over (e.g., less than one hour or less than 24 hours) corresponding which the files are downloaded. Example actions to be performed if the selected condition is met can be selected from only track for reporting or send a notification to the email addresses provided by the administrator. In some embodiments, other conditions and actions can be selected. The administrator also has the option to cancel any policy for the enterprise.

Figure 9:
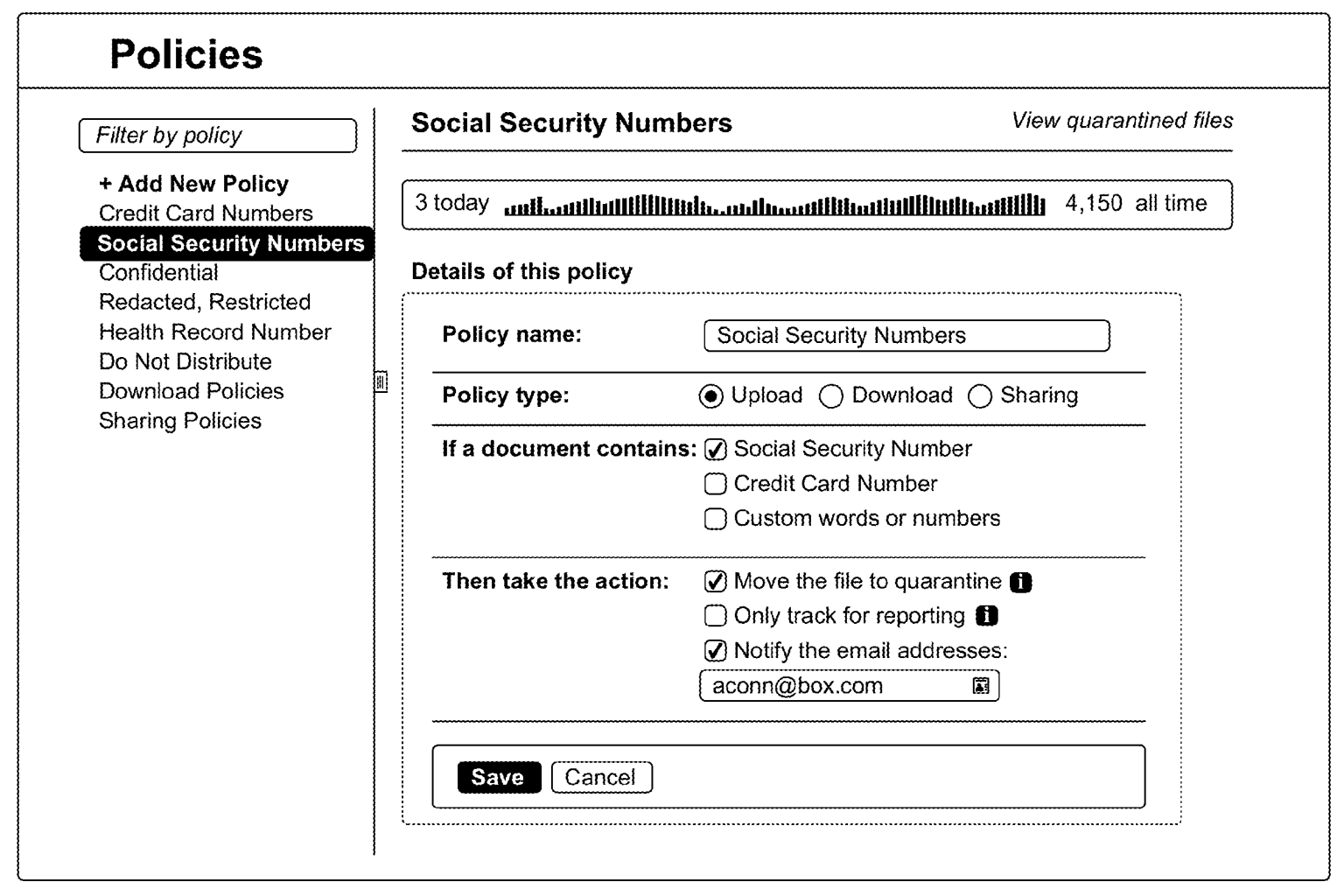

FIG. 9 depicts a screenshot showing an example of a user interface, with information provided by the policy module 360, for selecting policy settings for uploading information to an enterprise account in the cloud-based platform (e.g., cloud-based collaboration and/or storage platform/service) and selecting details of a policy to be applied to an enterprise account in the cloud-based platform (e.g., cloud-based collaboration and/or storage platform/service). In the example of FIG. 9, the policy type is upload. The policy module 360 then prompts the administrator with appropriate prompts for the upload policy. For the condition for the example of FIG. 9, the administrator is prompted to select an uploaded document contains a social security number, a credit card number, or custom words or numbers. Example actions to be performed if the selected condition is met can be chosen from move the file to quarantine, only track for reporting, and/or send a notification to the email addresses provided by the administrator.

Figure 10A:
FIG. 10A depicts a screenshot showing an example of a user interface for selecting policy settings for sharing information in an enterprise account in the cloud-based platform (e.g., cloud-based collaboration and/or storage platform/service).

FIG. 10A depicts a screenshot showing an example of a user interface, with information provided by the policy module 360, for selecting policy settings for sharing information in an enterprise account in the cloud-based platform (e.g., cloud-based collaboration and/or storage platform/service). In the example of FIG. 10A, the policy type is sharing. The policy module 360 then prompts the administrator with appropriate prompts for the sharing policy. For the condition for the example of FIG. 10A, the administrator is prompted to select when a user shares content with anyone on the domains provided by the administrator. Example actions to be performed if the defined condition is satisfied can be selected from move the file to quarantine, only track for reporting, and/or send a notification to the email addresses provided by the administrator.

Once the administrator has selected preferences regarding a policy for the enterprise, the policy module 360 stores the information in the advanced tools database 370, and the policy engine 115 executes the stored policy.

After the administrator has defined a policy and elected to start the policy, the administrator can select the policy from the list of defined policies as shown on the left side of FIG. 10B, and statistics pertaining to the policy will be shown. FIG. 10B depicts a screenshot showing an example of a user interface providing statistics about a previously defined policy, Social Security Numbers, as defined in FIG. 9, in an enterprise account in the cloud-based platform (e.g., cloud-based collaboration and/or storage platform/service). The example of FIG. 10B shows the policy start date, the number of documents processed on upload (because the policy type is upload), and the number of documents effected by the policy (i.e., moved to quarantine). From the user interface, administrator can choose to edit the policy, delete the policy, and view quarantined files.

Figure 11:
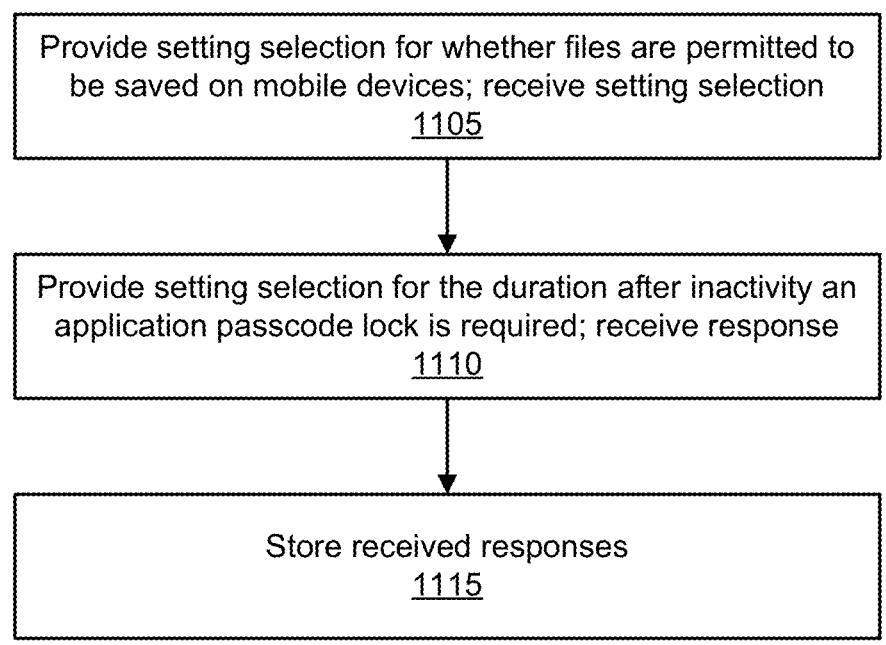
FIG. 11 depicts a flow chart illustrating an example process for selecting security settings for mobile devices accessing the enterprise's content in the cloud-based platform (e.g., cloud-based collaboration and/or storage platform/service).

FIG. 11 depicts a flow chart illustrating an example process for selecting security settings for mobile devices accessing the enterprise's content in the cloud-based platform (e.g., cloud-based collaboration and/or storage platform/service).

At block 1105, the content manager provides a setting selection for the administrator for whether files are permitted to be saved on mobile devices accessing enterprise account data in the cloud-based platform, and receives a setting selection from the administrator.

Then at block 1110, the content manager provides a setting selection for the administrator for the duration of inactivity on the mobile device after which entry of an application passcode is required, that is, the elapsed time of inactivity on the mobile device after which the user of the mobile device is required to enter a passcode. The content manager receives a response from the administrator.

And at block 1115, the content manager stores the responses from the administrator received at block 1105 and 1110.

Figure 12:
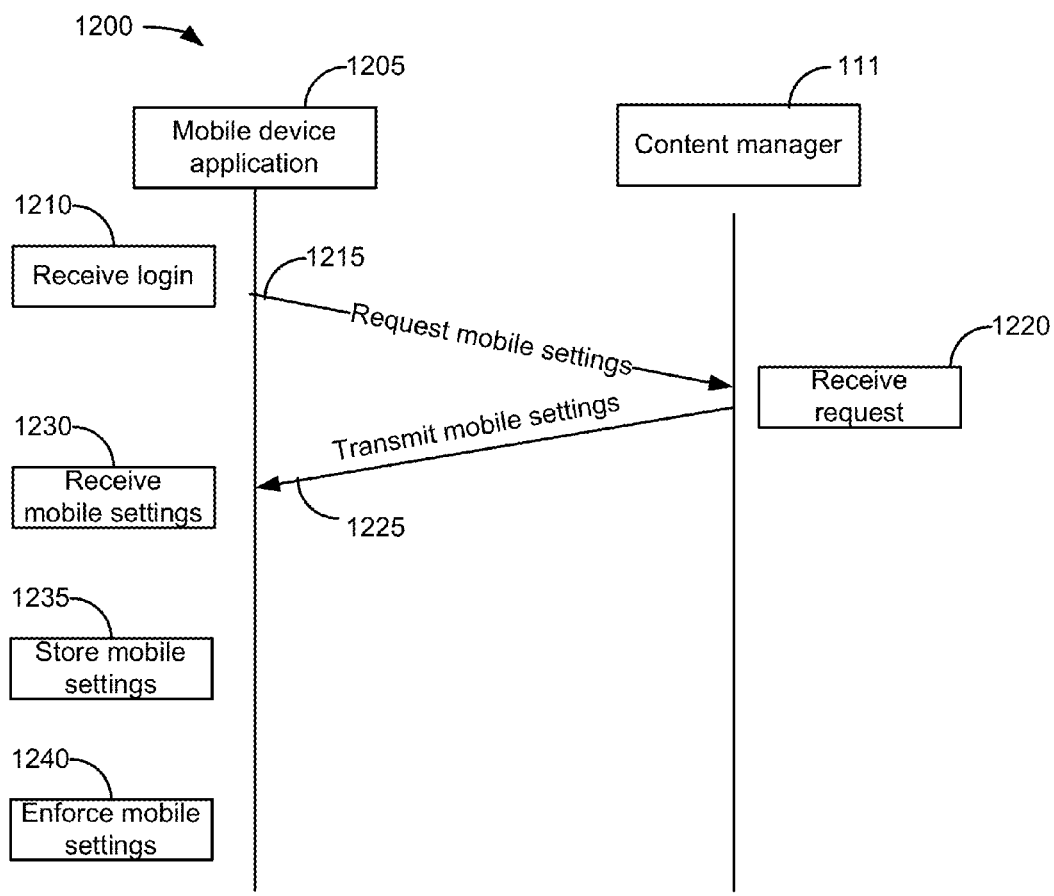
FIG. 12 depicts a flow chart illustrating an example communications process between a mobile device and the host server for the cloud-based platform (e.g., cloud-based collaboration and/or storage platform/service)

FIG. 12 depicts a flow chart illustrating an example communications process between an application running on a mobile device that permits the user to access data stored in the cloud-based platform (e.g., cloud-based collaboration and/or storage platform/service) and the content manager for the cloud-based platform for setting security settings on the mobile device.

The actions of the mobile device application 1205 on the left and the content manager 111 on the right are shown relative to each other as a function of time, with time increasing in the downward direction in FIG. 12. Transmissions between the mobile device application 1205 and the content manager 111 are shown by the arrows crossing the center of FIG. 12.

The mobile device application 1205 receives a user login to the mobile device application at block 1210. Then at transmission 1215, the mobile device application 1205 transmits a request for mobile security settings to the content manager 111. The content manager 111 receives the request at block 1220, and transmits the stored mobile security settings to the mobile device application 1205 at transmission 1225.

Then at block 1230, the mobile device application 1205 receives the mobile security settings. Next, at block 1235, the mobile device application 1205 stores the mobile security settings locally, and at block 1240, the mobile device application 1205 enforces the mobile security settings.

Figure 13:
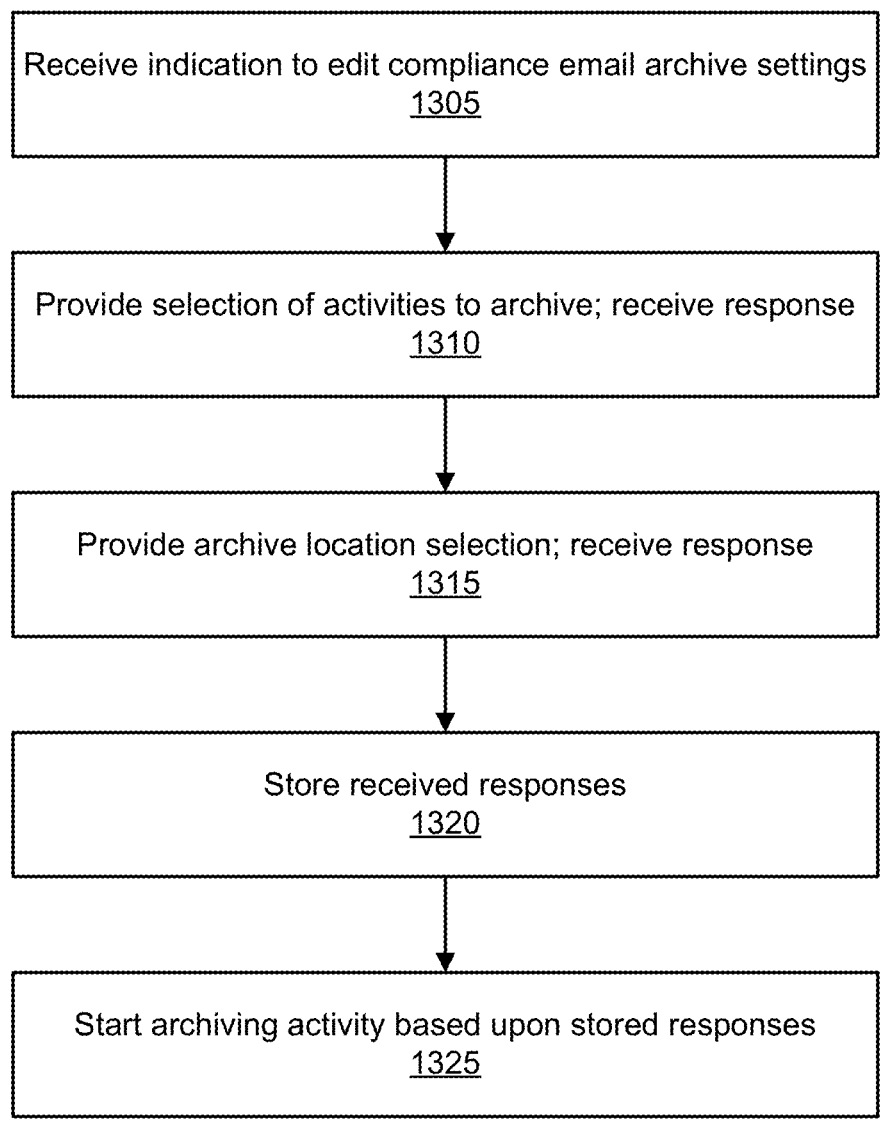
FIG. 13 depicts a flow chart illustrating an example process for selecting compliance email archive settings for an enterprise account in the cloud-based platform (e.g., cloud-based collaboration and/or storage platform/service).

FIG. 13 depicts a flow chart illustrating an example process for selecting compliance email archive settings for an enterprise account in the cloud-based platform (e.g., cloud-based collaboration and/or storage platform/service).

At block 1305, the content manager receives an indication from the administrator to edit compliance email archive settings. Then at block 1310, the content manager provides a menu of activities for the administrator to select from for archiving. For example, the activities for archiving can be selected from no archiving; archive comments, discussions, and tasks; and archive comments, discussions, tasks, and invitations. Other options can also be offered to the administrator. The content manager receives a selection from the administrator.

Then at block 1315, the content manager provides a selection of archive locations to which the archived activities are to be emailed. For example, the user performing the action can be emailed, or a specific email address provided by the administrator can be used.

At block 1320, the content manager stores the response, and at block 1325, the content manager begins archiving activity based upon the stored response.

Figure 14:
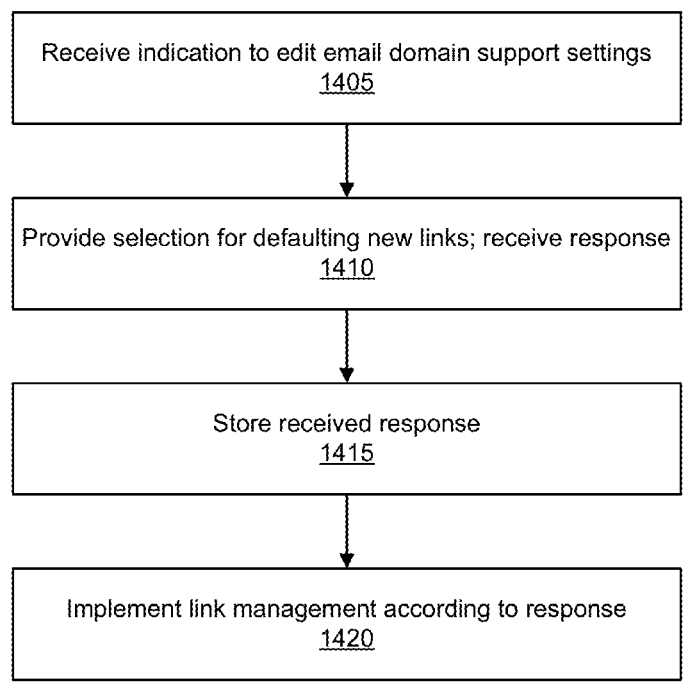
FIG. 14 depicts a flow chart illustrating an example process for selecting email domain support settings for an enterprise account in the cloud-based platform (e.g., cloud-based collaboration and/or storage platform/service).

FIG. 14 depicts a flow chart illustrating an example process for selecting email domain support settings for an enterprise account in the cloud-based platform (e.g., cloud-based collaboration and/or storage platform/service).

At block 1405, the content manager receives an indication from the administrator to edit email domain support settings. Then at block 1410, the content manager provides options for new links to default to. For example, the options can include anyone with the link can be permitted to access it and no log in is required; users at specified email domains with the link can access it as well as collaborators at non-specified email domains; and only invited collaborators in the folder can access the link, and external sharing of data is disabled. Other options can also be offered to the administrator. The content manager receives a selection from the administrator.

At block 1415, the content manager stores the received response, and at block 1420, the content manager implements the link management according to the received response.

Figure 15:
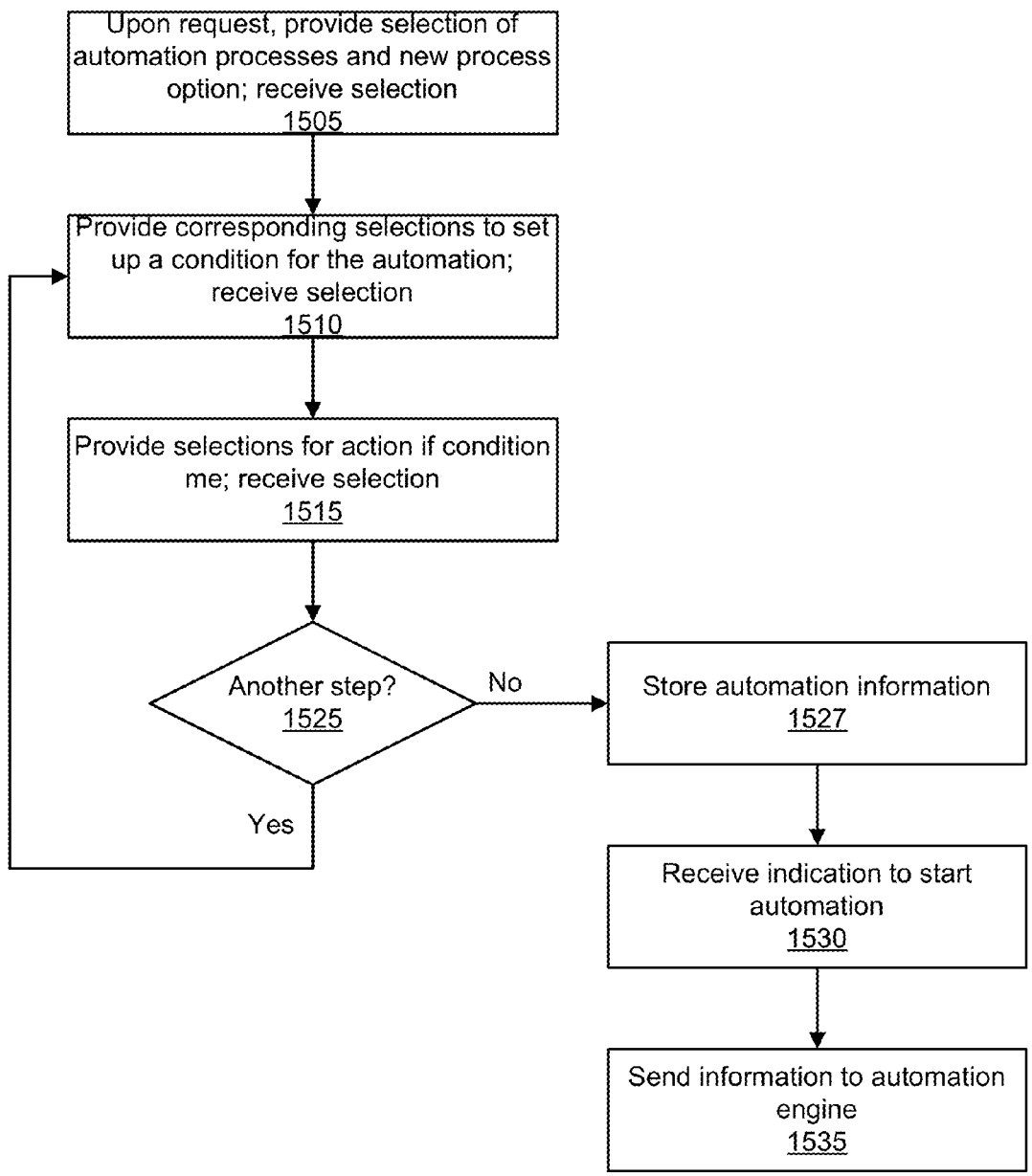
FIG. 15 depicts a flow chart illustrating an example process for selecting automation settings for an enterprise account in the cloud-based platform (e.g., cloud-based collaboration and/or storage platform/service).

FIG. 15 depicts a flow chart illustrating an example process for selecting automation settings for an enterprise account in the cloud-based platform (e.g., cloud-based collaboration and/or storage platform/service).

At block 1505, upon request by an administrator of an enterprise account, the content manager provides a selection of automation processes that can be selected for editing or the option to define a new automation process and receives a response from the administrator.

Then at block 1510, the content manager provides appropriate selections for the selected automation process to set up a condition for the automation. For example, the condition can be when a file is uploaded to the cloud-based service to a particular folder. The content manager receives the selection.

Next, at block 1515, the content manager provides appropriate selections for the selected automation process to set up an action if the condition is met. For example, assigning an approval task to a particular user. The content manager receives the selection.

At decision block 1525, the content manager determines whether the administrator wants to add another step to the automation process. If another step is to be added (block 1525—Yes), the process returns to block 1510.

If there are no more steps to be added to the automation process (block 1525—No), at block 1527, the content manager stores the automation information.

At block 1530, the content manager receives an indication to initiate the automation process, and at block 1535, the content manager sends the automation process information to the automation engine for performing the automation.

Figure 16:
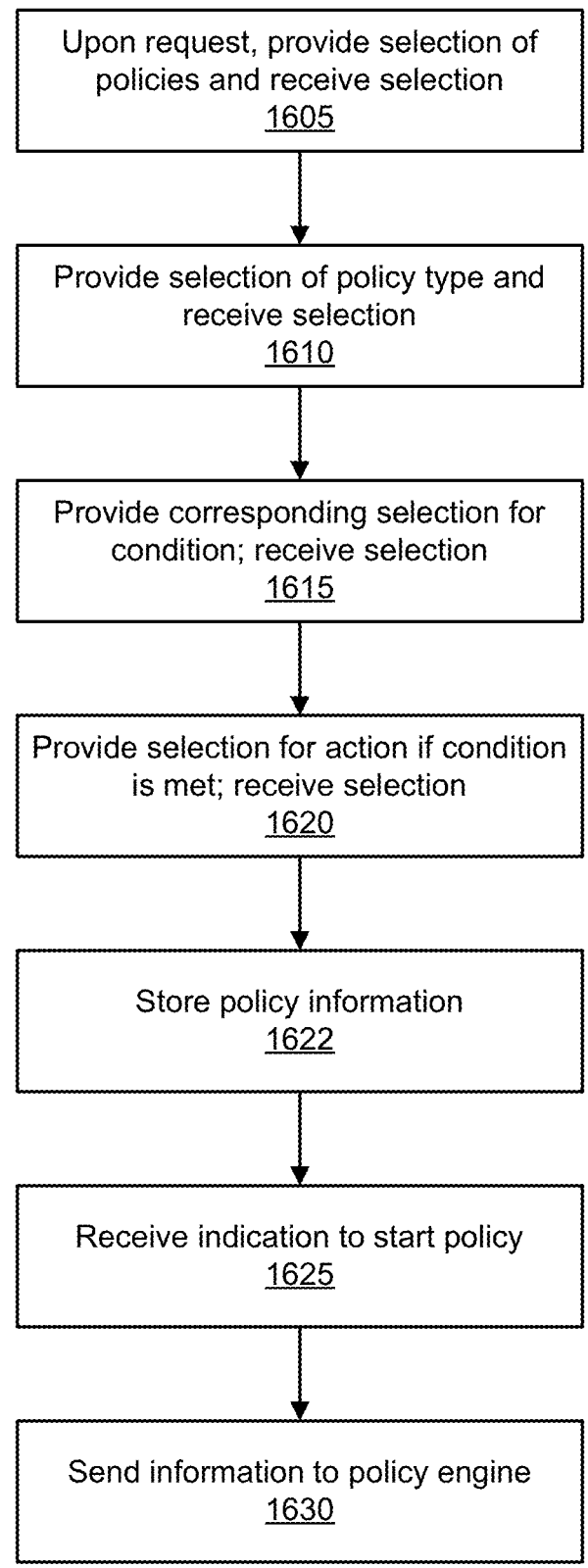
FIG. 16 depicts a flow chart illustrating an example process for selecting policy settings for an enterprise account in the cloud-based platform (e.g., cloud-based collaboration and/or storage platform/service).

FIG. 16 depicts a flow chart illustrating an example process for selecting policy settings for an enterprise account in the cloud-based platform (e.g., cloud-based collaboration and/or storage platform/service).

At block 1605, upon request by an administrator of an enterprise account, the content manager provides a selection of policies that can be selected for customization or the option to select a new policy to be entered and receives a response from the administrator.

Then at block 1610, the content manager provides appropriate selections for selecting a policy type, for example, policies that apply to uploaded data to, downloaded data from, and shared date within the cloud-based service. The content manager receives a response on the policy type.

Next, at block 1615, the content manager provides appropriate selections for the selected policy type to set up a condition for the policy. For example, if the selected policy type is downloading data, the condition can be when a user downloads a given number of files within a certain time period, where the administrator selects the number of files and the time period for the policy condition. The content manager receives a selection.

At block 1620, the content manager provides appropriate selections for the selected policy type to set up an action if the condition is met. For example, sending a notification by email to a specified user. The content manager receives a selection.

At block 1622, the content manager stores the policy information. Then at block 1625, the content manager receives an indication to initiate implementing the policy, and at block 1630, the content manager sends the policy information to the policy engine for performing the automation.

Figure 17:
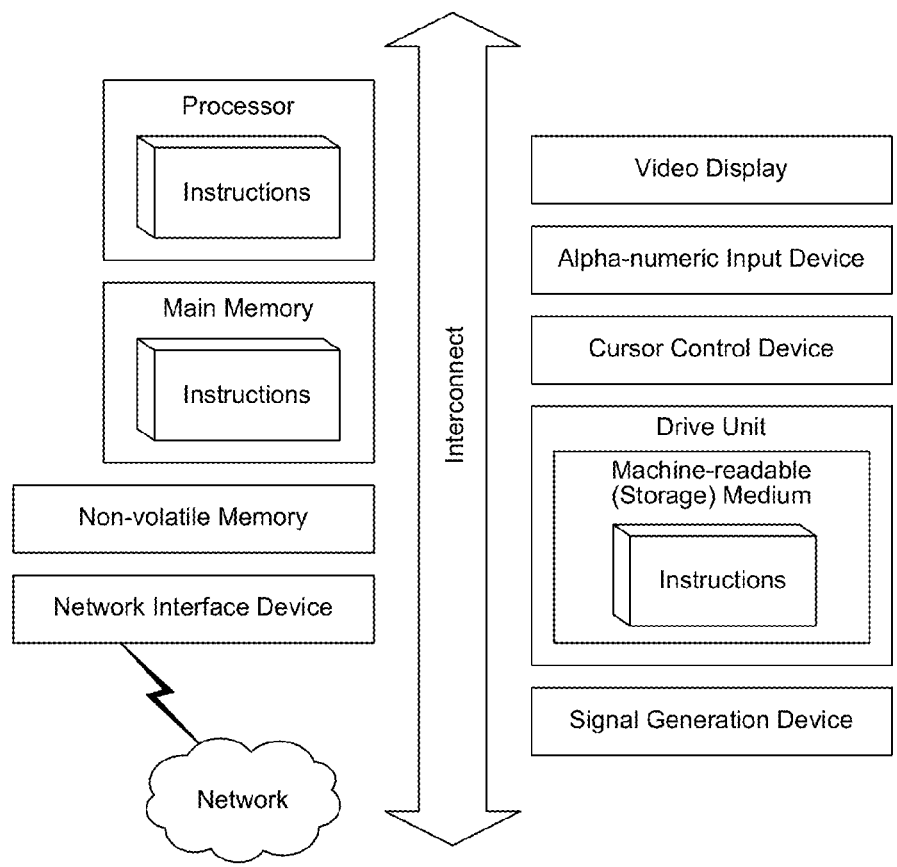
FIG. 17 shows a diagrammatic representation of a machine in the example form of a computer system within which a set of instructions, for causing the machine to perform any one or more of the methodologies discussed herein, may be executed.

FIG. 17 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method of setting mobile security settings for mobile devices used to access data provided by users in a cloud collaboration environment, the method comprising:
   receiving, at a server, a policy authorized by an administrator of an enterprise account of the cloud collaboration environment, the policy associated with mobile security settings on a mobile device of a user of the enterprise account, the policy including a policy type, a condition, and an action to perform if the condition is satisfied;
   concatenating one or more workflows associated with the policy type, the condition, and the action into an automation process;
   wherein the one or more workflows include tasks performed by the server in response to the policy type, the condition, and the action,
   wherein the policy type is selected from at least one of: download of content from the enterprise account, upload of content to the enterprise account, or sharing of content associated with the enterprise account,
   wherein the condition is based on at least one of: a number of downloaded files from the enterprise account, a time period over which the files are downloaded, uploading a file to a particular folder of the enterprise account, commenting on a file in the enterprise account, sharing a folder between users in the enterprise account, completion of the tasks;
   upon detecting that the condition for the automation process is satisfied, receiving a selection for the action;
   transmitting, by the server and based at least in part on the selection, the policy to a mobile device application running on at the mobile device, wherein the policy includes instructions for the mobile device application to configure security settings on the mobile device, and wherein the mobile device application is associated with the enterprise account; and
   in response to detecting that the action is a quarantine action, executing the action of moving one or more files in the enterprise account to a quarantine location, the one or more files in the quarantine location viewable to the administrator.

2. The method of claim 1, further comprising:
   receiving, at the server, a duration of inactivity on the mobile device after which a passcode lock is required to be entered by a user to access data from the enterprise account in the cloud collaboration environment via the mobile device application;
   transmitting by the server to the mobile device application the duration, wherein the mobile device application enforces the requirement for entry of the passcode lock after the duration of inactivity has occurred.

3. The method of claim 1, wherein the transmission of the policy occurs in response to a request from the mobile device application.

4. The method of claim 3, wherein the request is made by the mobile device application after the user logs in to the mobile device application.

5. The method of claim 1, wherein the action includes sending a notification to an email addresses provided by the administrator.

6. A system of a cloud-based collaboration environment which provides enhanced configurable mobile security settings, the system comprising:
- a processor;
- a memory having stored thereon instructions which, when executed by the processor, causes the system to:
- receive a policy authorized by an administrator of an enterprise account on a cloud-based collaboration environment, the policy associated with mobile security settings on a mobile device of a user of the enterprise account, the policy including a policy type, a condition, and an action to perform if the condition is satisfied;
- concatenate one or more workflows associated with the policy type, the condition, and the action into an automation process;
- wherein the one or more workflows include tasks performed by the server in response to the policy type, the condition, and the action,
- wherein the policy type is selected from at least one of: download of content from the enterprise account, upload of content to the enterprise account, or sharing of content associated with the enterprise account,
- wherein the condition is based on at least one of: a number of downloaded files from the enterprise account, a time period over which the files are downloaded, uploading a file to a particular folder of the enterprise account, commenting on a file in the enterprise account, sharing a folder between users in the enterprise account, completion of the tasks;
- upon detecting that the condition for the automation process is satisfied, receive a selection for the action;
- transmit the policy to a mobile device application running on at the mobile device, wherein the policy includes instructions for the mobile device application to configure security settings on the mobile device, and wherein the mobile device application associated with the enterprise account; and
- in response to detecting that the action is a quarantine action, execute the action of moving one or more files in the enterprise account to a quarantine location, the one or more files in the quarantine location viewable to the administrator.

7. The system of claim 6, wherein the system is further caused to
- receive, a duration of inactivity on the mobile device after which a passcode lock is required to be entered by a user to access data from the enterprise account in the cloud collaboration environment via the mobile device application;
- transmit to the mobile device application the duration, wherein the mobile device application enforces the requirement for entry of the passcode lock after the duration of inactivity has occurred.

8. The system of claim 6, wherein transmission of the policy occurs in response to a request from the mobile device application, and further wherein the request is made by the mobile device application after the user logs in to the mobile device application.

9. The system of claim 6, wherein the action includes sending a notification to an email addresses provided by the administrator.

* * * * *